Dec. 2, 1969    D. BERGER ET AL    3,481,641
GRASPING IMPLEMENT
Filed June 23, 1967    3 Sheets-Sheet 2
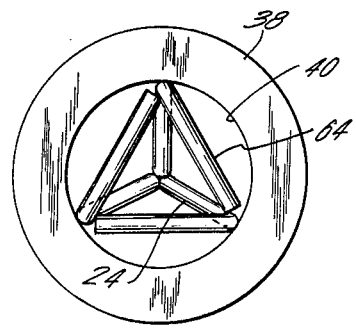
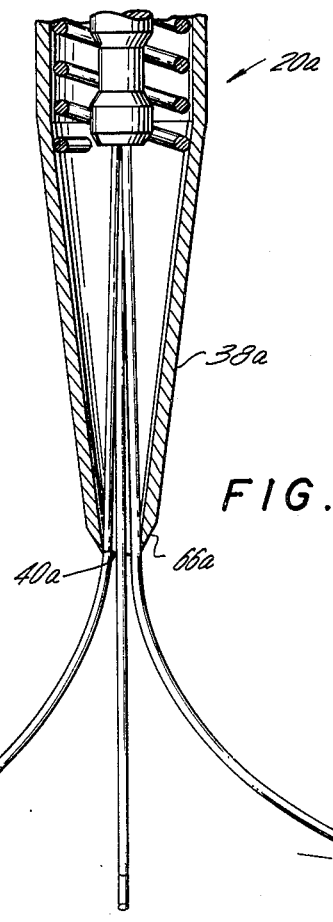
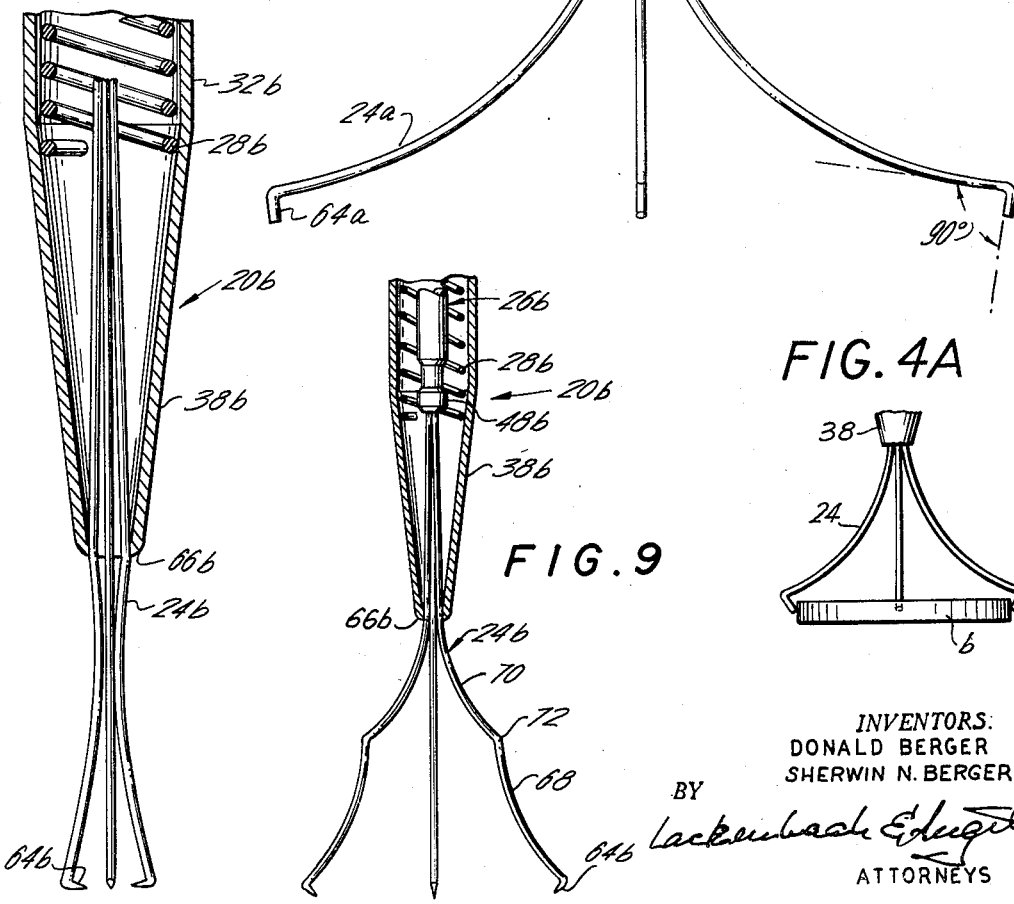
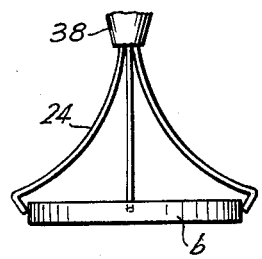
INVENTORS:
DONALD BERGER
SHERWIN N. BERGER
BY Lackenbach Edgar
ATTORNEYS

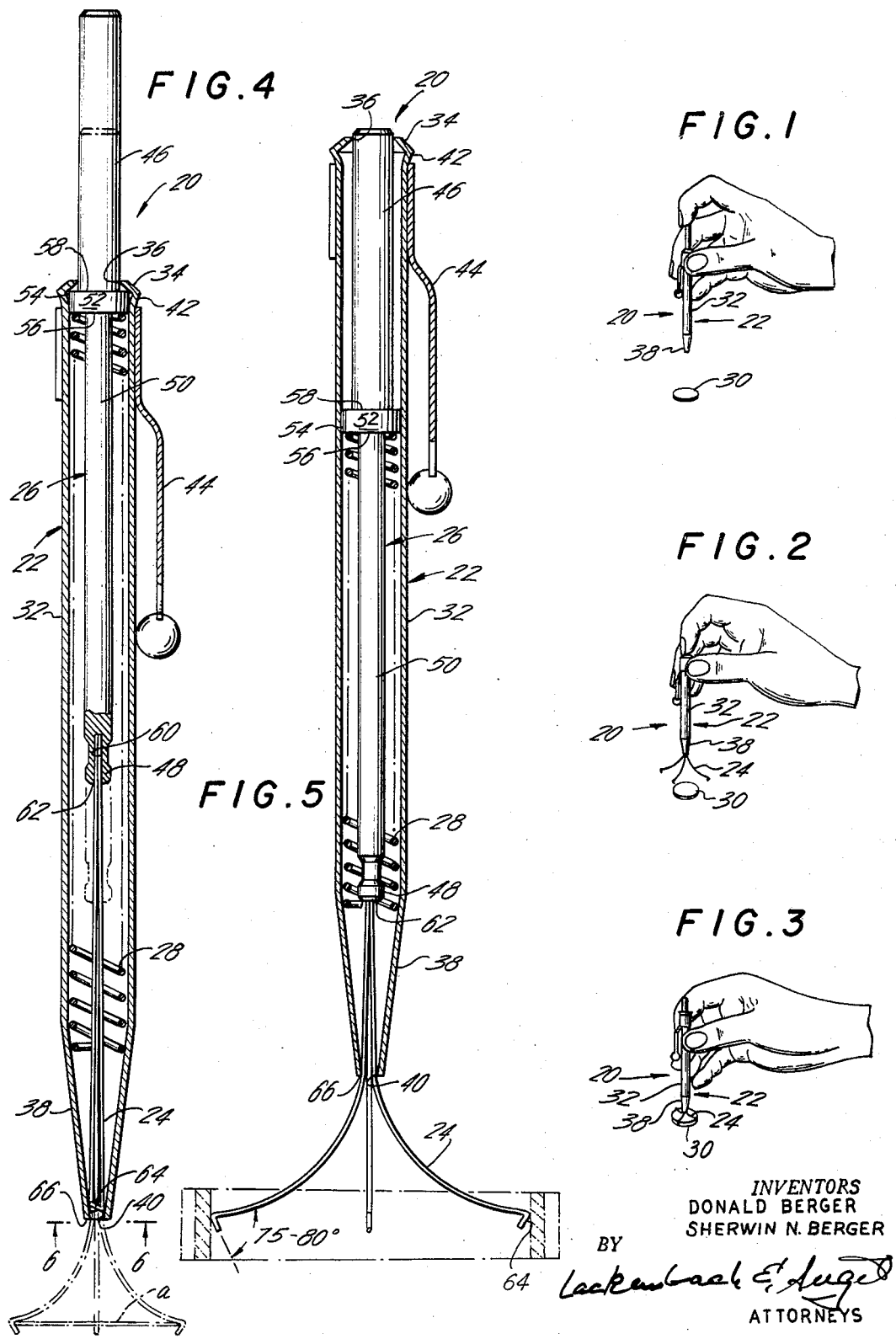

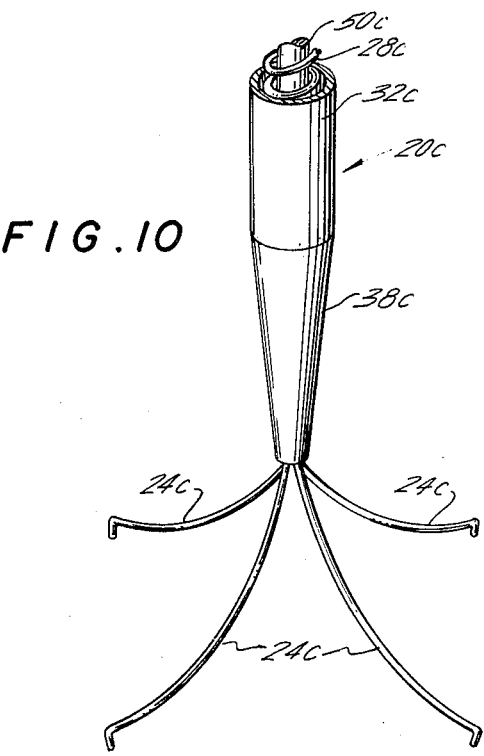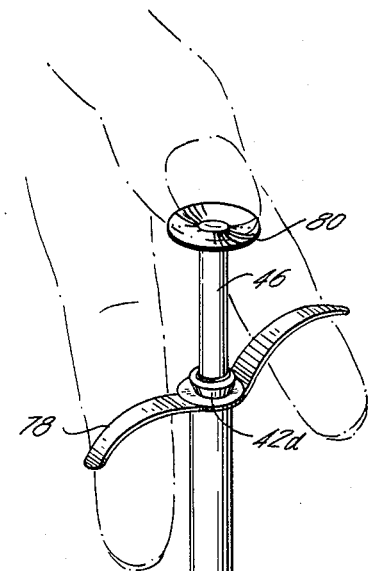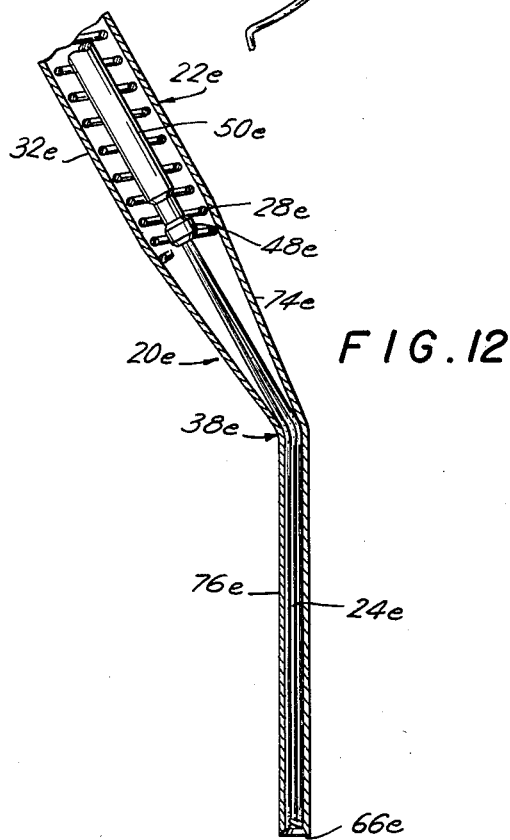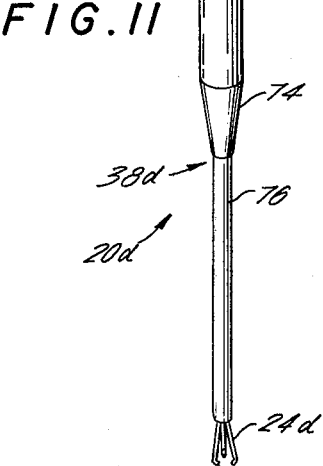

United States Patent Office 3,481,641
Patented Dec. 2, 1969

3,481,641
GRASPING IMPLEMENT
Donald Berger, Essex County, N.J., and Sherwin N. Berger, Nassau County, N.Y., assignors to Universal Technical Products, Inc., a corporation of New York
Filed June 23, 1967, Ser. No. 648,328
Int. Cl. B66f 11/00
U.S. Cl. 294—100                    7 Claims

ABSTRACT OF THE DISCLOSURE

Grasping implement comprising casing means and finger means constructed and arranged to enable relative movement to effect shifting between grasping and non-grasping configurations.

---

This invention relates generally to grasping implements and more particularly to grasping implements having movable finger means.

A primary object of the present invention is to provide grasping implements particularly adapted to facilitate the picking up and the manipulation of thin, small, delicate, hot, sterile, radioactive or oddly shaped objects.

Another primary object of the present invention is to provide implements of the class described which are economical to manufacture, light in weight, easily manipulated, which may be readily sterilized, which may be easily inserted in and withdrawn from obstructed passages, which firmly grip any article regardless of its size and shape, which can be positioned and operated by the fingers of a single hand, and which hold without requiring continued finger pressure.

Other primary objects of the present invention, in addition to the foregoing objects, are the provision of implements of the class described which are simple in construction, efficient in operation, and adapted to easily and quickly engage and hold objects and to release them.

Other primary objects of the present invention, in addition to each of the foregoing objects, are the provision of implements of the class described adapted to grip or grab an article or object in a manner quite similar to the use of a man's fingers. so constructed and arranged to enable articles or objects to be picked up or grasped out of reach by hand, capable of grasping a thin object from a flat surface, and capable of grasping objects out of sight, and out of holes or other restricted places.

Another primary object of the present invention, in addition to each of the foregoing objects, is to provide implements of the class described having flexible mechanical finger means that may be adjusted at will.

It is a feature of the present invention that grasping implements constructed in accordance therewith are of generally universal application and capable of diverse usages by artisans, craftmen and professional men.

It is another feature of the present invention that implements constructed in accordance therewith allow full inspection of all surfaces of highly polished or critical components without contamination or breakage of delicate parts, without scratching, smudging, staining, contaminating or otherwise damaging or dirtying the objects.

The present invention resides in the combination, construction, arrangement and disposition of the various component parts and elements incorporated in improved grasping implements constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof.

In the drawing:
FIG. 1 is a persepctive view of a grasping implement constructed in accordance with the principles of the present invention in the unactuated configuration thereof;
FIG. 2 is a perspective view similar to FIG. 1 illustrating the implement in the fully actuated position thereof;
FIG. 3 is a perspective view similar to the preceding figures illustrating the implement in one type of grasping configuration thereof;
FIG. 4 is a cross-sectional elevational view of the grasping implement of the preceding figures in the unactuated position thereof and illustrating in phantom another type of grasping configuration thereof;
FIG. 4A is a partial elevational view of the grasping implement of the preceding figures illustrating the implement in yet another type of grasping configuration thereof;
FIG. 5 is a view similar to FIG. 4 illustrating the implement of the preceding figures in still another type of grasping configuration thereof;
FIG. 6 is an enlarged view taken along the line 6—6 of FIG. 4;
FIG. 7 is an enlarged cross-sectional partial view of another implement constructed in accordance with the principles of the present invention;
FIG. 8 is an enlarged cross-sectional partial view similar to FIG. 7 illustrating still another embodiment or modification of an implement constructed in accordance with the principles of the present invention in a partially extended position;
FIG. 9 is a cross-sectional partial elevational view similar to the preceding figure illustrating the implement thereof in a fully extended or actuated configuration;
FIG. 10 is a persepctive partial illustration of yet another implement constructed in accordance with the principles of the present invention;
FIG. 11 is a perspective view of still another implement constructed in accordance with the principles of the present invention; and
FIG. 12 is a cross-sectional partial elevational view of yet still another implement constructed in accordance with the principles of the present invention.

With reference now to the drawing, and particularly to FIGS. 1–5 thereof, there is shown and illustrated a grasping implement constructed in accordance with the principles of the present invention and designated generally by the reference character 20.

The implement 20 comprises casing means, such as a generally tubular casing 22; finger means, such as a plurality of spring fingers 24; and moving means operatively associated therebetween, such as a plunger 26 and a compression spring 28 or other biasing means operatively associated with the casing 22 and plunger 26. The implement 20 is constructed and arranged to enable depression of the plunger 26 relative to the casing 22 to cause the spring fingers 24 to advance and flair outwardly of the casing 22 to permit the spring fingers 24 to be disposed generally outwardly of an object 30 and to enable the compression spring 28 to extend the plunger 26 upon release thereof to withdraw the spring fingers 24 radially and longitudinally inwardly of the casing 22 to pick up and grasp the object 30.

It is to be understood that while the implement 20 is constructed and arranged to be plunger operated to the extended position thereof and to be spring biased towards the retracted configuration thereof the implement 20 may be constructed and arranged for manual operation or for automatic or semi-automatic operation in both directions, for spring extension of the spring fingers 24, or for a biased grasp of hollow objects internally, if desired, without departing from the present invention. For the greatest universal utility, however, and ease of manipulation in most operations, the implement 20 is, however, preferably constructed and arranged generally as shown, that is, for plunger operated, spring return, or spring biased external gripping usage.

The casing 22 may be of substantially any desired configuration and size, but is preferably fabricated unitarily and of generally tubular configuration comprising the generally cylindrical medial portion 32, a rearward end portion 34 deformed generally radially inwardly to define a clearance hole 36 of lesser diameter than the cylindrical portion 32 to enable passage therethrough of the plunger 26 and a forward end portion 38 deformed generally inwardly to define a clearance hole 40 of lesser diameter than the diameter of the cylindrical portion 32 to enable passage therethrough of the spring fingers 24. The rearward end portion 34 is further preferably deformed generally outwardly of the cylindrical portion 32 to define a radially outwardly extending portion 42 for retaining gripping means, such as a pocket clip 44, or the like, on the cylindrical portion 32 of the casing 22. The forward end portion 38 of the casing 22 may be of substantially any desired configuration, comprising, for example, the generally conical or tapered configuration shown and illustrated in FIGS. 1–5.

The plunger 26 preferably comprises a handle or actuating portion 46 adapted to extend outwardly of the casing 22 through the rearward clearance hole 36, a forward end portion 48 structurally associated with the spring fingers 24, and an intermediate portion 50 extending between the handle or actuating portion 46 and the forward end portion 48. The plunger 26 is preferably further provided with a generally radially outwardly extending flange portion 52 disposed, for example, adjacent the juncture of the handle portion 46 and the intermediate portion 50. The plunger 26 may, for example, be formed from a single piece of material, the handle portion 46, the flange portion 52, and the intermediate portion 50 being formed therefrom in any conventional manner, as by machining, grinding, forging, molding, or the like, or fabricated of a plurality of separate elements or components.

The flange portion 52 preferably defines a peripheral edge 54 adapted to slidably engage the interior of the cylindrical portion 32 of the casing 22, a forward annular surface 56 adapted to be engaged by one end of the compression spring 28, and a rearward annular surface 58 adapted to engage or abut the inwardly deformed rearward end portion 34 of the casing 22 in the fully retracted position, as shown in FIG. 4 to limit movement of the plunger 26 outwardly of the casing 22. The engagement between the rearward clearance hole 36 and the handle or actuating portion 46 together with the engagement between the peripheral surface 54 of the flange 52 with the interior of the cylindrical portion 32 of the casing 22 functions to guide the plunger 26 relative to the casing 22, to preclude relative rocking movement therebetween and to retain the plunger 46 axially aligned and centered within the casing 22.

The forward end portion of the spring 28 preferably directly engages the inwardly deformed forward end portion 38 of the casing 22 to retain the spring 28 under compression at all times.

The spring fingers 24, as hereinbefore pointed out, are structurally associated with the front end portion 48 of the plunger 26. For example, the front end portion 48 of the plunger 26 may be provided with a generally axial bore 60 extending inwardly from the front end 62 thereof, with the spring fingers 24 being inserted therewithin and the front end portion 48 of the plunger 26 swaged, crimped, or otherwise deformed generally radially inwardly to securely retain the spring fingers 24 within the bore 60. However, it is to be understood that the spring fingers 24 may be otherwise associated with the plunger 26, as by means of welding, soldering, brazing, adhesive bonding, screw threads, chuck or clamp means, or even be integrally formed with the plunger 26. Preferably, however, for economical manufacture and durability the spring fingers 24 are swaged or crimped into permanent securement with the plunger 26 as hereinbefore detailed.

While substantially any number of spring fingers 24 may be provided, for maximum utility, that is, for substantially universal grasping of diverse shaped objects, there are provided three spring fingers 24. Each of the spring fingers 24 is preferably preformed to assume a non-linear configuration when unconstrained, so that the end portions 64 thereof will move along a path generally divergent from the direction of sliding during movement thereof through the forward clearance hole 40 of the casing 22, and preferably along a generally curvilinear path. With the spring fingers 24 so preformed, the end portions 64 thereof will flair outwardly, as shown, during extension of the spring fingers 24 and will have a component of motion generally radially inwardly during retraction to securely grasp objects therebetween. The spring fingers 24 may, for example, and as shown in FIGS. 1–5 be preformed to comprise a generally smoothly curved portion.

The end portion 64 of the spring fingers 24 are preferably formed or bent generally inwardly to form an angle of, for example, 75–80° relative to the adjacent portion of the spring fingers 24. Forming or bending the end portions 64 to such angle, that is, an angle of approximately 75–80° provides several substantial improvements over previously known constructions. Firstly, with the end portions 64 formed to such an angle, the grasping force applied to an object engaged thereby will always have a component generally radially inwardly for improved grasping. Secondly, with the spring fingers 24 in a partially extended position, as shown in phantom in FIG. 4, the end portions 64 of the spring fingers 24 will be closely tangential to a surface, or the like, from which it is desired to pick up an object. Thirdly, spring fingers formed to comprise end portions disposed at such an angle enable the engagement of objects in several district gripping relationships, namely, with the object, such as a thin sheet-like object disposed within the crook of the angle as indicated at $a$ in FIG. 4 or with the object being engaged by the ends of the end portions 64 as indicated at $b$ in FIG. 4A. Hence, objects, and especially thin objects, may be readily picked up and grasped or held securely by implements constructed in accordance with the principles of the present invention.

Moreover, as indicated in phantom in FIG. 5, this construction enables improved internal gripping of hollow objects by defining outward extending generally sharp angular portions for such internal engagement of hollow objects.

While the forward clearance aperture 40 may be of substantially any desired size, preferably, and with reference now to FIG. 6, the clearance aperture provided for three spring fingers is of a diameter to closely circumscribe an equilateral triangle formed by the end portions 64 enabling nesting of the end portions 64 within the clearance hole 40 in the form of an equilateral triangle, as clearly shown in FIG. 6 to enable the implement 20 to securely grasp and hold small or narrow objects. The size of the clearance hole 40 may be likewise appropriately selected for implements having more or less than three spring fingers in a similar manner, or longer or shorter end portions 64 as prescribed by the use of the implement.

The forward end 66 of the forward end portion 38 of the casing 22 is generally flat and perpendicular to the longitudinal axis of the casing 22. It is to be understood, however, that the present invention is not limited to such a flat forward end construction.

Accordingly, and with reference now to FIG. 7, there is shown and illustrated another embodiment or modification of grasping implement constructed in accordance with the principles of the present invention and designated generally by the reference character 20a. In this embodiment or modification, and in the other embodiments or modifications to be hereinafter described, like reference characters will be utilized to designate like parts as in the preceding embodiment or modification, with the reference characters being provided with a suffix, such as the suffix a utilized in the description and illustration of the embodiment or modification of FIG. 7. Furthermore, only those features which differ from that previously described are illustrated in the drawing and detailed in the following description, it being understood that the remainder of the implement may be as hereinabove disclosed.

With the above in mind, and with reference to FIG. 7, the forward end 66a of the implement 20a comprises a generally outwardly and rearwardly extending chamfer or taper adjacent the forward clearance hole 40a. Furthermore, the end portions 64a of the spring fingers 24a are disposed at approximately a 90° or right angle relative to the adjacent portion of the spring finger 24a, it being expressly understood that the end portions of the spring fingers may be disposed at substantially any desired angle for specific or general application, and, specifically, the end portions may be at approximately a right angle, an angle of 75–80°, or may be substantially less than 75° for particular usages. However, it is to be emphasized again that, for the reasons hereinabove stated, the end portions are preferably at an angle of approximately 75–80°.

With reference now to FIGS. 8 and 9, a grasping implement 20b may be fabricated in accordance with the principles of the present invention wherein the spring fingers 24b are preformed to a multiple curved configuration. The spring fingers 24b may, for example, comprise a forward curved portion 68 and a rearward curved portion 70 having either similar or different curvatures, as desired. Preferably, the curvature of each of the portions 68 and 70 is in the same direction, such as outwardly concave with the portions 68 and 70 meeting at a discontinuity or sharp bend 72, or the like. Such construction, that is, multiple curved spring fingers enables the provision of differing rates of outward flaring for the end portions 64b dependent upon which of the curved portions 68 and 70 is engaging the forward clearance hole 40b. More specifically, the embodiment or modification shown in FIGS. 8 and 9 enables a very gradual outward flaring of the end portions 64b during the initial outward travel of the spring fingers 24b followed by a rapid or high rate outward flaring of the end portions 64b during the latter portion of the extension or outward movement of the fingers 24b relative to the casing 22b. Hence, the implement 20b is especially well adapted for gripping small objects with a closely controlled gripping force when the portion 68 is engaged with the edge of the clearance hole 40b while the presence of the portion 70 enables a rapid and relatively wide flare of the end portions 64b for ease in engagement of the end portions 64b with an object.

Additionally, the forward end 66b of the casing forward end portion 38b comprises a generally rounded edge.

Furthermore, the end portions 64b of the spring fingers 24b are sharpened, as by grinding the end portion 64b to a generally knife-type edge enabling more secure gripping of relatively soft objects and further enabling the sharpened wire ends or knife-type edges to easily and readily slip beneath a thin flat object and an underlying smooth flat surface as an aid in enabling easy pickup or grasping of an object, and particularly of very thin objects in a manner not possible with any other type of grasping tool.

As hereinbefore pointed out, a number of spring fingers greater or lesser than three may be provided in implements constructed in accordance with the principles of the present invention. Accordingly, and with reference now to FIG. 10, there is shown and illustrated an implement 20c constructed in accordance with the principles of the present invention which comprises four spring fingers 24c.

Moreover, the spring fingers may be of substantially any desired length, that is, of a length to be disposed adjacent or within the forward casing clearance hole when fully retracted, substantially inwardly of the casing when fully retracted, or substantially extending from the casing when fully retracted, depending on the intended use of the implement. However, for maximum general utility, as hereinbefore pointed out, the length of the fingers is preferably chosen so that the end portion will be just retracted into the casing upon full retraction.

As also hereinbefore pointed out, implements constructed in accordance with the principles of the present invention may be of substantially any desired size and configuration. More particularly, and with reference now to FIG. 11, there is shown and illustrated a grasping implement constructed in accordance with the principles of the present invention and designated generally by the reference character 20d. The generally cylindrical portion 32d of the grasping implement 20d is of substantially greater longitudinal extent than the cylindrical portion 22 of the embodiment or modification of FIGS. 1–5.

The inwardly deformed forward end portion of the implement, as hereinbefore pointed out, may likewise be of substantially any desired configuration, comprising a long taper, a short taper, a curvilinear portion, a generally radially extending flange, or, as shown and illustrated in FIG. 11 may comprise a tapered portion 74 and a reduced diameter generally cylindrical portion 76 to provide a long nose on the implement 20d. The reduced diameter cylindrical portion 76 may, as shown and illustrated in FIG. 11 be generally axially aligned with the cylindrical portion 22d and of generally linear configuration, or may be of generally curvalinear configuration, may be bent at one or more places, or, as shown and illustrated in FIG. 12, an implement 20e may be constructed in accordance with the principles of the present invention having a reduced diameter cylindrical portion 76e disposed generally angularly of the cylindrical portion 22e.

With further reference to FIG. 11, the outwardly extending portion 42d of the implement 20d may be utilized to retain a grip, such as a finger grip 78 associated with the casing 22.

In each of the embodiments or modifications hereinabove described, disclosed, illustrated and shown, the spring fingers comprise generally cylindrical spring wires, but it is to be understood that it is within the ambit of the present invention to provide spring fingers fabricated of other shapes, such as flat wire, wire having a polygonal cross section, a plurality of spring wires, or the like. In any case, since the contact area between the spring fingers and the object grasped thereby is quite small, visibility of the object grasped is substantially unimpeded thereby.

Yet further, by the use of different stiffness spring fingers and differing rate compression springs, substantially any desired grasping force may be provided. While the handle or actuating portion 46 of the plunger 26 may comprise merely a cylindrical rod, there may also be provided an enlarged or mushroom-type end portion 80 as shown in FIG. 11. Moreover, the end portion 80 may, if desired, be extended to form a ring, or the like, if desired.

The forward end 66e of the implement 20e may comprise an inwardly and rearwardly extending chamfer, as shown in FIG. 12 to assist the end portions 64 to nest in the manner above described and to reduce wear of the spring fingers.

The various component parts and elements of improved grasping implement constructed in accordance with the principles of the present invention may be fabricated of substantially any desired materials. Preferably, however, the implement is entirely fabricated from durable, chemically non-reactive material capable of being readily cleaned and/or sterilized by means of solvents, bactericidal solutions, autoclaving, or the like, such as stainless steel, and the simple, generally smooth construction enables ready and thorough cleaning and sterilizing of the entire implement. Moreover, especially for chemical, biological, and metallurgical usage, the spring fingers may be fabricated of materials having exceptional resistance to chemical attack, decomposition, or the like, such as titanium and platinum. In any case, the spring fingers are generally capable of being readily bent or modified when desired for specific grasping configurations without being subject to accidental deformation from the desired configuration during use.

What is claimed is:

1. Grasping implement comprising, in combination, a smooth, unitary, elongated, hollow casing fabricated by deforming spaced apart portions of a single length of tubing generally inwardly to define a tubular generally cylindrical medial portion disposed between forward and rearward reduced diameter portions; an elongated plunger comprising a generally cylindrical handle portion adapted for axially inward telescoping movement through said rearward reduced diameter portion, a generally cylindrical intermediate portion disposed within said cylindrical medial portion in general axial alignment with said handle portion, a narrow generally circular flange portion disposed between said handle and intermediate portions adapted for sliding movement within said cylindrical medial portion and abutment against said rearward reduced diameter portion to limit movement of said plunger rearwardly and outwardly of said casing, and a forward end portion provided with a bore extending generally axially inwardly of the forward end thereof; a plurality of elongated wire form spring fingers pre-formed to assume generally outwardly concave curved diverging relative positions when unconstrained to enable the end portions thereof to grasp objects of substintial lateral size extending generally forwardly of said forward end portion bore a distance positioning the end portions thereof generally within said casing when said flange is abutted against said rearward reduced diameter portion and adapted to be extended outwardly through said forward reduced diameter portion upon inward telescoping movement of said plunger; and a helical coil compression spring having an outside diameter selected to fit within said cylindrical medial portion of said casing and an inside diameter selected to fit about said plunger intermediate and forward end portions disposed generally concentrically within said casing medial portion with the end portions thereof engaged between said forward reduced diameter portion of said casing and said flange of said plunger to bias said plunger and spring fingers rearwardly relative to said casing.

2. Grasping implement defined in claim 1 wherein said casing further comprises a generally outwardly deformed portion disposed between said cylindrical medial portion and said rearward reduced diameter portion to define an outwardly extending abutment for retaining a grip member or the fingers of an operator to facilitate handling of the implement.

3. Grasping implement defined in claim 1 wherein said spring fingers comprise a plurality of outwardly concave curvilinear portions angularly oriented relative to each other to enable differing rates of outward flare of the tip portions thereof at differing locations along the path of said spring finger movement.

4. Grasping implement defined in claim 1 wherein each of said spring fingers further comprises a grasping tip portion extending generally towards a location generally central of said spring fingers, said tip portions being disposed at an angle within the range of 75–80° relative to the adjacent portion of said spring fingers, enabling the presentation of a substantial radial component and secure grasping of an object even at the extreme limits of the path of movement of the spring fingers.

5. Grasping implement defined in claim 1 wherein said forward reduced diameter portion comprises a generally elongated, truncated conical configuration having a minimum diameter adapted to closely circumscribe said spring fingers to enable said fingers to securely grasp objects of a minimal size and wherein the forward end portion of said spring is engaged generally medially of the conical portion to enable a maximum length of spring to be utilized to provide a more substantially constant biasing force throughout the length of plunger travel.

6. Grasping implement defined in claim 5 wherein said forward reduced diameter portion further comprises an elongated generally constant diameter rigid tubular portion extending generally forwardly of such conical portion, enabling the end portion thereof to be disposed in a desired location with facility and precision.

7. Grasping implement comprising, in combination, a smooth, unitary, elongated, hollow casing comprising a tubular medial portion disposed between forward and rearward reduced diameter portions; an elongated, unitary, solid plunger comprising a handle portion adapted for axially inward telescoping movement through said rearward reduced diameter portion, a flange portion disposed forwardly of said handle portion adapted for sliding movement within said medial portion and abutment against said rearward reduced diameter portion to limit movement of said plunger rearwardly and outwardly of said casing, and a forward end portion provided with a bore extending generally axially inwardly of the forward end thereof; a plurality of elongated wire form spring fingers pre-formed to assume generally outwardly concave curved diverging relative positions when unconstrained extending generally forwardly of said forward end portion bore and adapted to be extended outwardly through said forward reduced diameter portion upon inward telescoping movement of said plnuger; and a helical coil compression spring disposed generally concentrically within said casing and about said plunger with the end portions thereof engaged between said forward reduced diameter portion of said casing and said flange to bias said spring fingers inwardly of said casing; each of said spring fingers further comprising a grasping tip portion extending generally towards a location generally central of said spring fingers, said tip portions being disposed at an angle within the range of 75–80 degrees relative to the adjacent portion of said spring fingers, enabling the presentation of a substantial radial component and secure grasping of an object even at the extreme limits of the path of movement of the spring fingers.

References Cited
UNITED STATES PATENTS

| | | | |
|---|---|---|---|
| 987,173 | 3/1911 | Salé | 81—43 |
| 1,168,115 | 1/1916 | Rueckert | 294—100 |
| 2,212,013 | 8/1940 | Devareaux | 294—19 X |
| 2,532,972 | 12/1950 | Vertin | 81—43 X |

EVON C. BLUNK, Primary Examiner

R. D. GUIOD, Assistant Examiner

U.S. Cl. X.R.

81—43